(12) United States Patent
Yenneti et al.

(10) Patent No.: US 10,208,754 B2
(45) Date of Patent: Feb. 19, 2019

(54) OIL FLOODED COMPRESSOR SYSTEM AND METHOD

(71) Applicant: Ingersoll-Rand Company, Davidson, NC (US)

(72) Inventors: Srinivasa Rao Yenneti, Bangalore (IN); Premchand Reddy Punuru, Karnataka (IN)

(73) Assignee: Ingersoll-Rand Company, Davidson, NC (US)

( * ) Notice: Subject to any disclaimer, the term of this patent is extended or adjusted under 35 U.S.C. 154(b) by 656 days.

(21) Appl. No.: 14/878,557

(22) Filed: Oct. 8, 2015

(65) Prior Publication Data

US 2017/0101991 A1 Apr. 13, 2017

(51) Int. Cl.
| | |
|---|---|
| *B01D 47/00* | (2006.01) |
| *F04C 29/04* | (2006.01) |
| *F04C 18/16* | (2006.01) |
| *F04C 29/02* | (2006.01) |
| *F04C 29/00* | (2006.01) |
| *B01D 53/26* | (2006.01) |
| *B01D 53/14* | (2006.01) |

(52) U.S. Cl.
CPC .......... *F04C 29/04* (2013.01); *B01D 53/1425* (2013.01); *B01D 53/263* (2013.01); *F04C 18/16* (2013.01); *F04C 29/0092* (2013.01); *F04C 29/02* (2013.01); *F04C 2240/81* (2013.01); *F04C 2270/195* (2013.01); *F04C 2270/225* (2013.01)

(58) Field of Classification Search
None
See application file for complete search history.

(56) References Cited

U.S. PATENT DOCUMENTS

| 3,680,283 A | 8/1972 | Jones, Jr. | |
|---|---|---|---|
| 3,785,755 A * | 1/1974 | Novak | F04C 29/0007 |
| | | | 418/85 |

(Continued)

FOREIGN PATENT DOCUMENTS

WO 2005055354 A1 6/2005

OTHER PUBLICATIONS

Rotary Screw Compressors, Fixed Speed, CompAir Brochure, 8 pages.

*Primary Examiner* — Amber R Orlando
*Assistant Examiner* — Phillip Y Shao
(74) *Attorney, Agent, or Firm* — Taft, Stettinius & Hollister LLP

(57) ABSTRACT

The present disclosure provides a system including an oil flooded compressor operable for compressing a working fluid. A dehumidifier is positioned upstream of the compressor to reduce the humidity of working fluid entering the compressor and to cool oil while regenerating the dehumidifier. A heat exchanger positioned upstream of the compressor includes passageways for oil and compressible working fluid to be transported in a heat transfer relationship therethrough such that the temperature of the oil is reduced within the heat exchanger. A control system including an electronic controller is operable for controlling an inlet temperature of the oil entering the compressor, controlling an inlet temperature and humidity of working fluid entering the compressor and a discharge temperature of the working fluid exiting the compressor.

17 Claims, 5 Drawing Sheets

(56) References Cited

U.S. PATENT DOCUMENTS

| | | | |
|---|---|---|---|
| 3,950,154 A * | 4/1976 | Henderson | B01D 53/261 96/126 |
| 4,220,197 A | 9/1980 | Schaefer et al. | |
| 5,027,606 A * | 7/1991 | Short | C09K 5/045 252/68 |
| 5,087,178 A | 2/1992 | Wells | |
| 5,318,151 A | 6/1994 | Hood et al. | |
| 5,925,169 A | 7/1999 | Vertriest | |
| 6,895,774 B1 | 5/2005 | Ares et al. | |
| 8,347,629 B2 | 1/2013 | Finkenrath et al. | |
| 8,955,323 B2 | 2/2015 | Kamiya | |
| 2013/0156548 A1 | 6/2013 | Takano et al. | |
| 2014/0271258 A1 | 9/2014 | Vezil et al. | |

\* cited by examiner

OIL FLOODED COMPRESSOR SYSTEM AND METHOD

TECHNICAL FIELD

The present application generally relates to industrial air compressor systems and more particularly, but not exclusively, improving system efficiency by utilizing the heat of compression from a lubricant to condition a compressible working fluid upstream of the compressor.

BACKGROUND

Industrial compressor systems are configured to produce large volumes of pressurized fluid such as air or the like. Efficiency improvements to compressor systems translate into cost savings for the system operator. Some existing systems have various shortcomings relative to certain applications. Accordingly, there remains a need for further contributions in this area of technology.

SUMMARY

One embodiment of the present invention is a unique compressor system with a control system operable to transfer heat between a compressible working fluid and a lubrication fluid upstream of an oil flooded compressor. Other embodiments include apparatuses, systems, devices, hardware, methods, and combinations for compressor systems with a unique method for increasing thermodynamic efficiency is disclosed herein. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
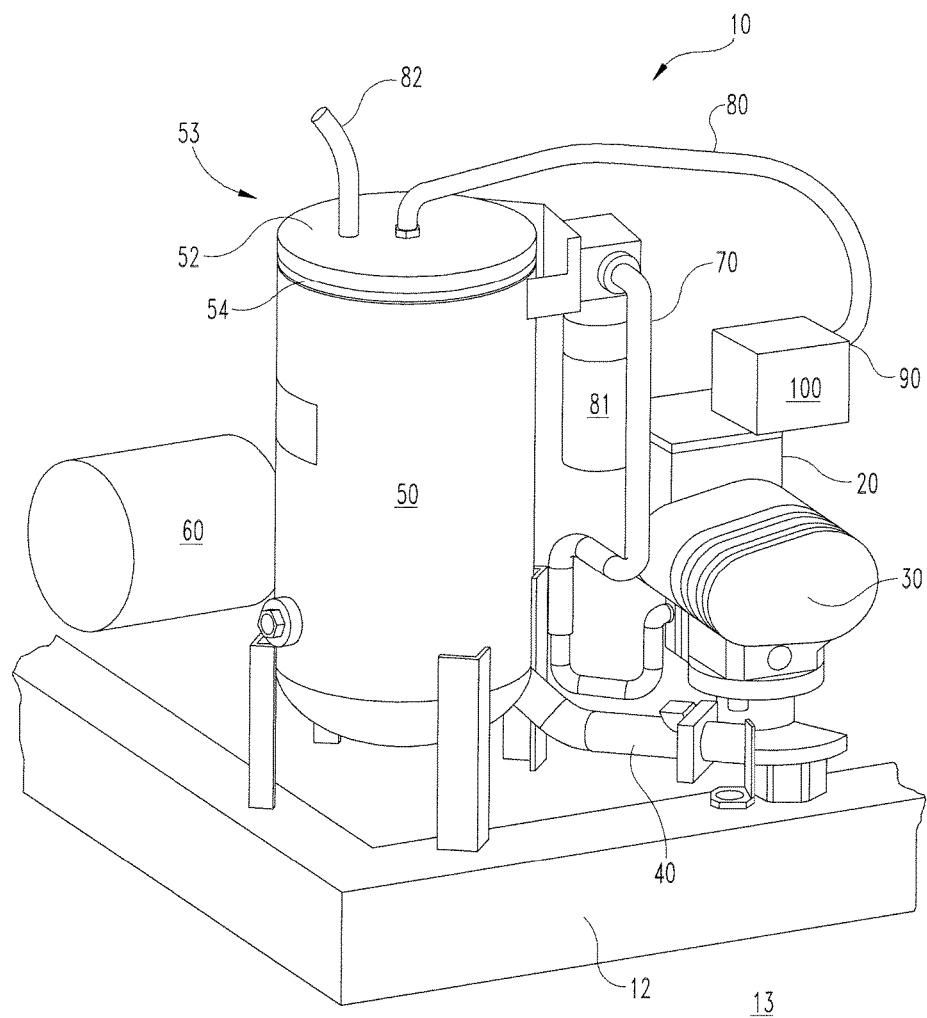
FIG. 1 is a perspective view of a compressor system according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Industrial compressor systems are configured to provide compressed fluids at a desired temperature, pressure and mass flow rate. Some compressor systems use fluid to fluid heat exchangers to control the temperature of compressed fluids at various stages within the system. The term "fluid" should be understood to include any gas or liquid medium used in the compressor system as disclosed herein. In some forms the present application can be directed to delivery of pressurized fluid with more than one fluid constituency such as a mixture of air and lubrication fluids including oil or the like. When the terms oil or lubricant are used herein it is intended to refer generally to a class of lubrication fluids that include petroleum based or synthetic formulations and can have a variety of properties and viscosities. When the term air is used it should be understood that other compressible working fluids can be substituted and not depart from the teachings or the present disclosure.

Referring now to FIG. 1, an exemplary compressor system 10 is shown in perspective view. The compressor system 10 includes a primary motive source 20 such as an electric motor, an internal combustion engine or a fluid-driven turbine and the like. The compressor system 10 can include a compressor 30 that may include single or multi-stage compression. The compressor 30 can be defined by oil flooded compressors such as a screw type however other types of oil flooded positive displacement compressors are contemplated herein. The primary motive source 20 is operable for driving the compressor 30 via a drive shaft (not shown) to compress gaseous fluids such as air and oil vapor or the like.

A structural base 12 is configured to support at least portions of the compressor system 10 on a support surface 13 such as a floor or ground. Portions of the compressed working fluid discharged from the compressor 30 can be transported through more one or more conduits 40 to a sump or separator tank 50 for separating fluid constituents such as air and oil or the like. One or more coolers 60 can be operably coupled with the system 10 for cooling working fluids to a desired temperature. The one or more coolers 60 can cool fluids such as compressed air, oil or other fluids to a desired temperature as defined by a control system. The control system can include a controller 100 operable for controlling the primary motive power source 20 and various valving and fluid control mechanisms (not shown) between the compressor 30 and intercoolers 60 such as, for example a blowdown valve 90.

The separator tank 50 can include a lid 52 positioned proximate a top portion 53 thereof. A seal 54 can be positioned between the lid 52 and separator tank 50 so as to provide a fluid tight connection between the lid 52 and the separator tank 50. Various mechanical means such as threaded fasteners (not shown) or the like can be utilized to secure the lid 52 to the separator tank 50. A blow down conduit 80 can extend from the separator tank 50 to the blow down valve 90. The blow down valve 90 is operable for reducing pressure in the separator tank 50 when the compressor 30 is unloaded and not supplying compressed air to an end load. In some configurations the blowdown conduit and associated valving may be omitted. An air supply conduit 82 can be operably coupled to the separator tank so as to deliver compressed air to a separate holding tank (not shown) or to an end load for industrial uses as would be known to those skilled in the art. An oil supply conduit 70 can extend from the separator tank 50 to the compressor 30 to supply oil that has been separated from the working fluid in the separator tank 50 to the compressor 30. One or more filters 81 can be used in certain embodiments to filter particles from the oil and/or separate contaminates such as water or the like from working fluids in the compressor system 10.

Figure 2:
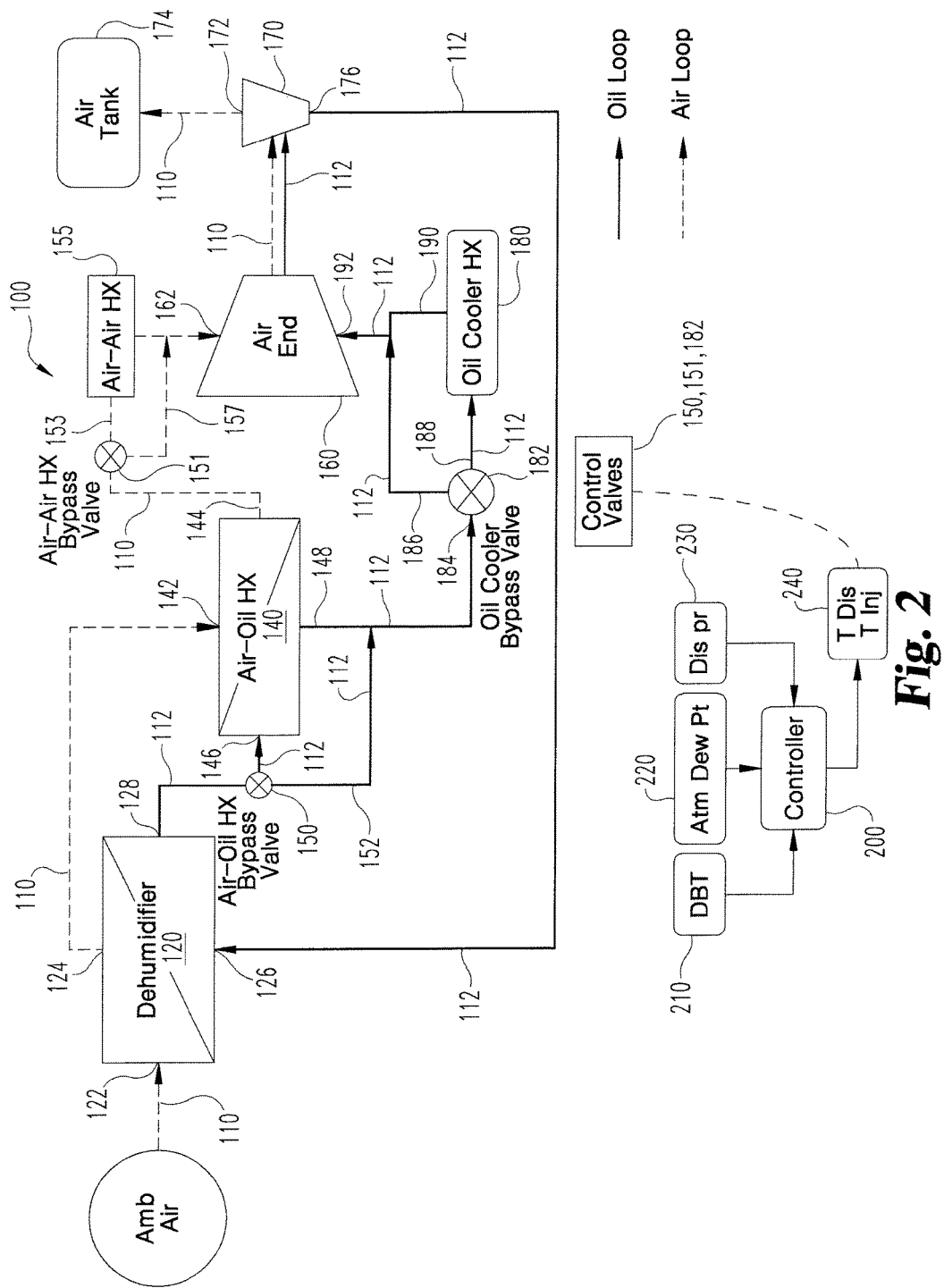
FIG. 2 is a schematic view of a portion of the compressor system of FIG. 1 illustrating a fluid flow diagram.

Referring now to FIG. 2, an illustrative embodiment of an exemplary compressor system 100 is depicted therein. The compressor system 100 includes an air circuit 110 delineated by a dashed line and an oil circuit 112 delineated by a solid line to define a flow path for each fluid. The air circuit 110 begins with a source of ambient air that is delivered to a dehumidifier 120 through an air inlet conduit 122. The air is dried or de-moisturized in the dehumidifier 120 to remove at least a portion of the water vapor entrained therewith. After the air is dried to a desired humidity level the dehumidified air egresses through an air outlet conduit 124 operably coupled to the dehumidifier 120. The air is then directed to an air preheater/oil cooler in the form of an air-oil heat exchanger 140 through an air inlet conduit 142 operably connected to the air-oil heat exchanger 140. The air can be heated as the oil gets cooled as they flow through the air-oil heat exchanger. The air is heated to a temperature defined by the temperature of oil flowing through the air-oil heat exchanger and the thermodynamic efficiency of air-oil heat exchanger. The operation of the air-oil heat exchanger will be described in more detail below.

The heated air is then directed to an air outlet conduit 144 operably coupled to the air-oil heat exchanger 140. It should be noted that at some operating conditions the air is not heated as it flows through the air-oil heat exchanger 140. The air is then transported to an air cooling or air-to-air bypass valve 151 operable for controlling air flow to an air-to-air heat exchanger or an air cooling heat exchanger 155. In some embodiments the air cooling heat exchanger 155 can include fluid such as water to exchange heat with the air. In other embodiments, other fluids such as ambient air or refrigerant and the like can be used as a heat exchange fluid. The air-to-air bypass valve 151 controls a flow split between an inlet conduit 153 connected to the air-to-air heat exchanger 155 and a bypass conduit 157 configured to bypass air around the air-to-air heat exchanger 155. The bypass conduit 157 is connected to an outlet conduit 162 downstream of the air-to-air heat exchanger 155. The outlet conduit 162 directs air to an inlet of a compressor 160 which is sometimes called the air end of the compressor system 100.

In this exemplary embodiment the compressor 160 is an oil flooded screw compressor wherein oil is injected into the compressor 160 to provide temperature control of the compressor discharge air. After compression, the mixture of air and oil is directed to a separator tank 170 whereby air and oil are separated in a manner that is known by those skilled in the art. An air outlet conduit 172 directs the relatively pure air to an air tank 174 or other end use pneumatic apparatus as would be typical in an industrial environment. The separated oil is then removed through an oil outlet conduit 176 operably connected to the air-oil separator tank 170. The oil heated from the compression process then flows through circuit 112 from the separator tank to an oil inlet conduit 126 connected to the dehumidifier 120. In some embodiments separate pumps (not shown) can be positioned in the oil circuit to move the oil from one location to another, however, in other embodiments the pressurized air can cause the oil to flow at a velocity required to provide a desired flow rate of the oil.

The heated oil can be used to regenerate the dehumidifier in certain embodiments such as those using desiccate-type dehumidifier configurations. The heated oil can help to dry out or regenerate the desiccate that has absorbed water from the air as the air flows through the dehumidifier 120. The oil is typically cooled as the regeneration process takes place, however, the oil can still be at an elevated temperature relative to the ambient air at this point in the flow circuit 112. The oil is then directed to an oil outlet conduit 128 operably connected to the dehumidifier 120 and is directed an air-oil heat exchanger bypass valve 150 wherein the control system, as will be described in more detail below, controls the output of the air-oil heat exchanger bypass valve 150. The bypass valve 150 controls the flow split of the oil flow directed to the air-oil heat exchanger 140 and the amount of the oil that is bypassed around the heat exchanger 140 to the bypass outlet conduit 152. The heated oil in the air-oil heat exchanger flows through the air-oil heat exchanger 140 in a heat transfer relationship with the air such that the temperature differential between the inlet air 162 and the inlet oil 192 is minimized at the inlet of the compressor 160. The control system is designed to minimize the temperature differential between the compressor inlet air and the inlet oil, however, the oil temperature has a minimum temperature limit defined by a pressure dew point temperature of the air at the compressor discharge. After traversing through the air-oil heat exchanger 140 the oil will be discharged through an oil outlet conduit 148 operably connected to the air-oil heat exchanger 140. At this point the oil exiting from the air-oil heat exchanger will be combined with any bypass oil that has been directed past the air-oil heat exchanger by the heat exchanger bypass valve 150.

An optional oil cooler 180 can be utilized in certain embodiments with the compressor system 100 illustrated herein. The oil cooler 180 can be used to further cool the oil below the temperature of the oil outlet from the air-oil heat exchanger 140 when the oil temperature exiting from the air-oil heat exchanger is higher than a limit defined by the control system. The oil cooler can include heat exchange between fluid such as ambient air or other cooling fluids. The oil cooler 180 can be coupled to an oil bypass valve 182 wherein oil from the air-oil heat exchanger and/or the heat exchanger bypass outlet conduit 152 can be directed to the oil cooler bypass valve 182 through an oil bypass valve inlet conduit 184. The oil cooler bypass valve 182 can then direct portions of the oil through a bypass line 186 to bypass the oil cooler 180 if the control system determines that the oil temperature is at a lower limit. The oil cooler bypass valve 182 can also be controlled to direct a portion of the oil to the oil cooler 180 through an inlet conduit 188 when further cooling is required. The oil bypass conduit 186 and an outlet conduit 190 extending from the oil cooler 180 are merged and the oil is then directed to an oil inlet conduit 192 operably connected to the compressor 160 wherein the oil flow circuit 112 is completed.

Figure 3A:
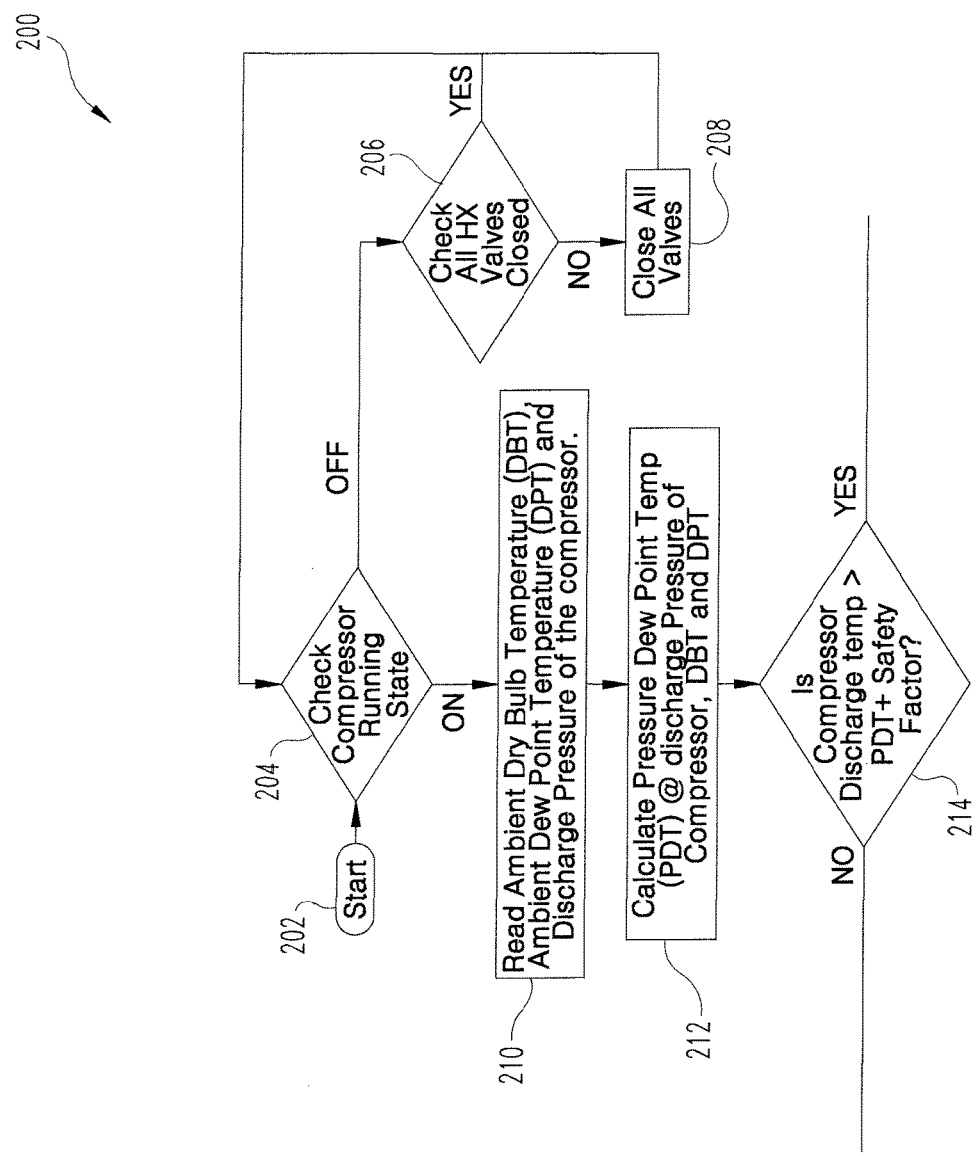
FIGS. 3a-3c show an exemplary flow chart illustrating a control method according to one embodiment of the present disclosure.
Figure 3B:
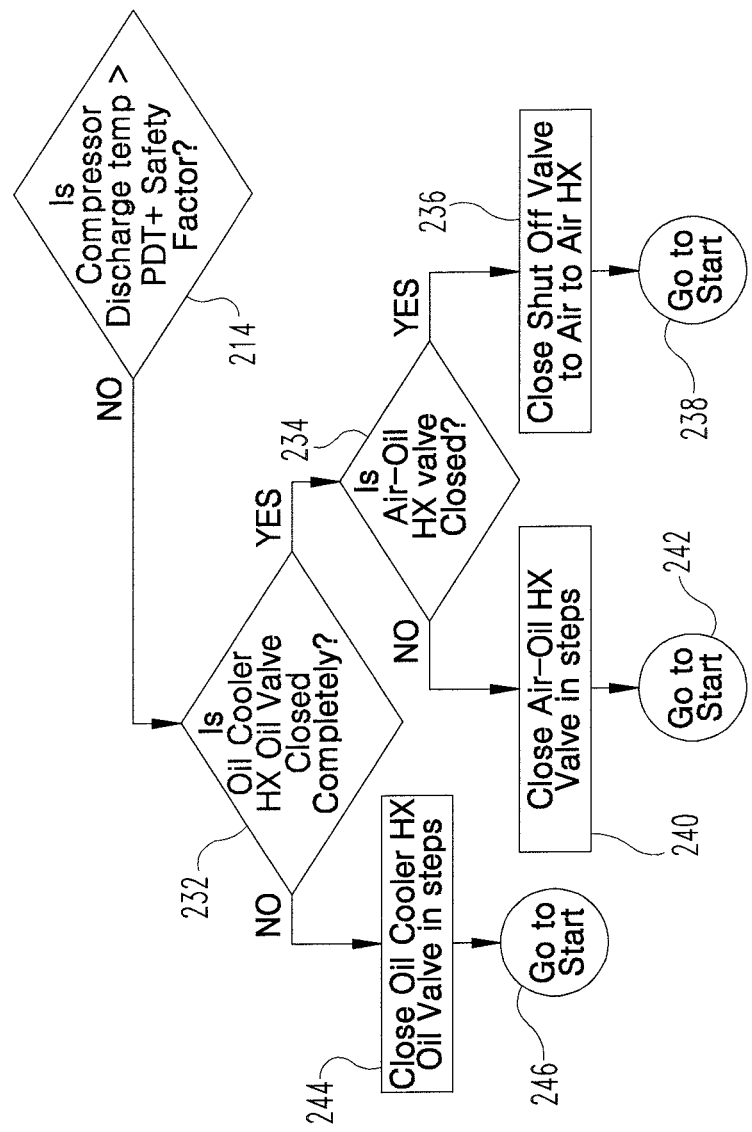
Figure 3C:
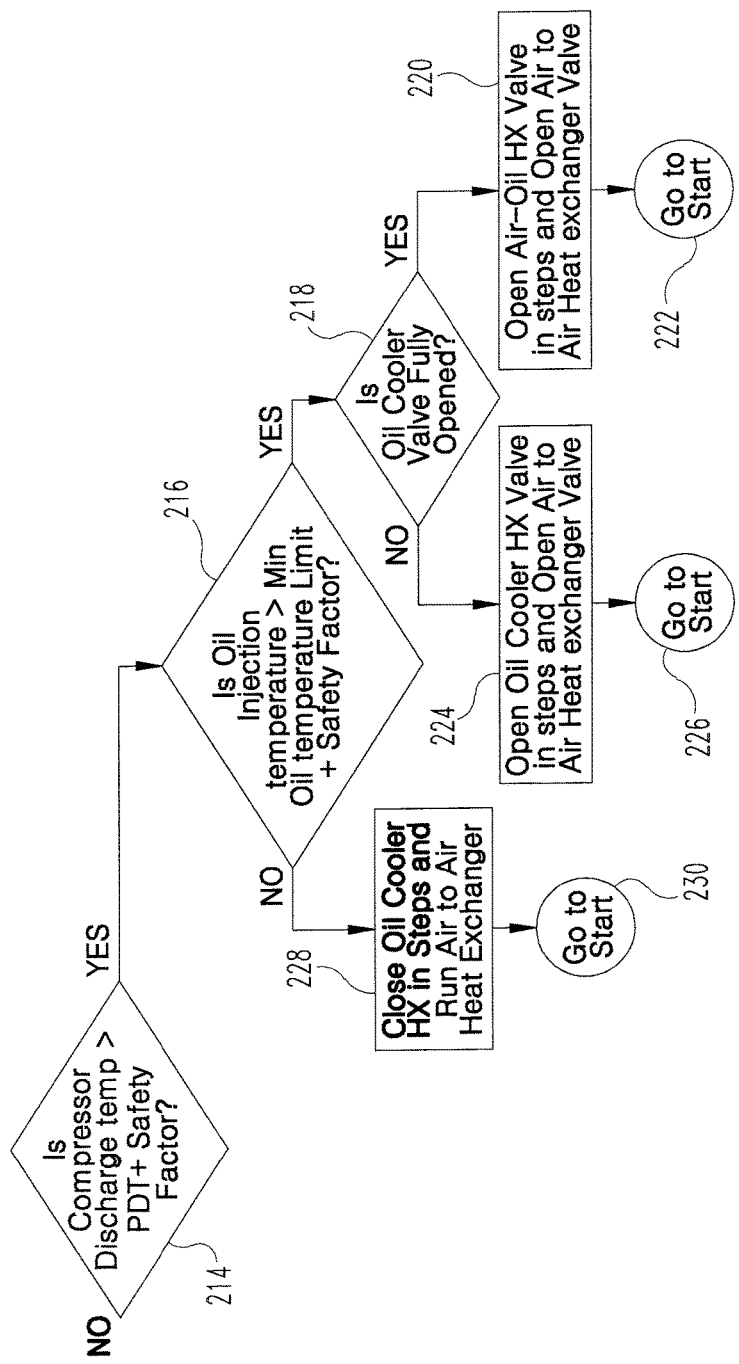

Referring now to FIGS. 3a-3c, an exemplary control method 200 is illustrated. The control method 200 starts at step 202 wherein the controller determines whether the compressor is running at step 204. If the compressor is not running the controller determines whether all the heat exchange valves are closed in the system at step 206, wherein a closed position of the valves prevents fluid from entering the associated heat exchangers. If all of the heat exchange valves are closed then the controller loops back to step 204 and continues operation. If all of the heat exchange valves are not closed at step 206 the controller sends a command signal to close all of the heat exchange valves at step 208 and loops back to step 204. If at step 204 the controller determines that the compressor is running, the controller checks the ambient dry bulb temperature, the ambient dew point temperature, and the discharge pressure of the compressed air exiting from the compressor at step 210. The controller then calculates a pressure dew point temperature based on the discharge pressure of the compressor, the dry bulb temperature and the ambient dew point temperature at step 212. At step 214 the controller determines whether the compressor discharge temperature is greater than the pressure dew point temperature. In some embodiments the control method will add a safety factor such as an additional temperature margin by way of example and not limitation 5-10° C. or more so as to ensure the compressed air flow does not include condensed water at the compressor discharge.

If the compressor discharge temperature is greater than the pressure dew point temperature then the control method moves to step 216 as shown in FIG. 3c. At step 216 the controller determines if the oil injection temperature is greater than a predefined minimum oil temperature limit. In some embodiments the minimum temperature limit of the oil includes a safety factor. For example if the defined minimum temperature at a particular pressure to prevent water condensation at the compressor exit is "X" then that limit may include a safety factor such as for example "X" plus 5° C. If the oil injection temperature is greater than the minimum oil temperature limit then the control system moves to step 218 where the controller then determines whether the oil cooler valve is fully opened. If the oil cooler valve is fully opened then the control system moves to step 220 and proceeds to open the air-oil heat exchanger bypass valve in incremental steps while running the air-to-air heat exchanger. At this point the control system moves to step 222 and loops back to the start 202.

If at step 218 the oil cooler valve is not fully opened then the control system moves to step 224 and opens the oil cooler heat exchanger oil valve in steps and runs the air-to-air heat exchanger. After which the control system moves to step 226 and loops back to the start 202. If the oil injection temperature is not greater than the minimum oil temperature limit at step 216 then the control system moves to step 228 and closes the oil cooler heat exchange valve in incremental steps while running the air-to-air heat exchanger. At this point in the control method the controller moves to step 230 and loops back to the start 202.

If the compressor discharge temperature is not greater than the calculated pressure dew point temperature at step 214 then the control method moves to step 232 to determine if the oil cooler heat exchanger oil valve is completely closed as shown in FIG. 3b. If the oil cooler heat exchanger oil valve is completely closed then the control method moves to step 234 to determine whether the air-oil heat exchanger bypass valve is closed. If the air-oil heat exchanger bypass valve is closed at step 234 then the controller will shut off the control valve to the air-to-air heat exchanger at step 236 and move to step 238 wherein the control method loops back to the start 202. If the air-oil heat exchanger bypass valve is not closed at step 234 then the control system will close the air-oil heat exchange bypass valve in incremental steps at step 240 and then move to step 242 wherein the control system will loop back to the start 202. If the oil cooler heat exchanger oil valve is not completely closed at step 232 then the control system will close the oil cooler heat exchanger oil valve in incremental steps at step 244. The control method then moves to step 246 and loops back to the start 202 of the control method.

In one aspect, the present disclosure includes a compressor system comprising: a lubrication supply system operable for supplying lubricant to a lubrication flooded compressor; a dehumidifier operable for removing moisture from a compressible working fluid; a heat based regeneration system having media for absorbing moisture, the regeneration system including a lubricant passageway adapted to receive heated lubricant discharged from the compressor such that the media is regenerated and the lubricant is cooled as the lubricant flows through the passageway; an inlet heat exchanger configured to receive compressible working fluid and heated lubricant exiting from the dehumidifier, the compressible working fluid and the lubricant forming a heat transfer relationship such that the lubricant is cooled and the compressible working fluid is heated in the inlet heat exchanger; and a first conduit for transporting the heated compressible working fluid from the inlet heat exchanger to a fluid cooler where the working fluid can be cooled and then passed to the compressor and a second conduit for transporting the cooled lubricant fluid from the inlet heat exchanger, wherein the compressor compresses the compressible working fluid to a desired pressure and discharges heated lubricant.

In refining aspects, the present disclosure system includes a compressor system further comprising a lubricant cooler; a lubricant cooler bypass valve operably coupled to the lubricant cooler; wherein an inlet heat exchanger bypass valve operable to selectively bypass a portion of the lubricant past the inlet heat exchanger; further comprised of a temperature sensor; wherein the temperature sensor measures at least one of a lubricant temperature and a working fluid temperature; further comprising a moisture sensor; wherein the moisture sensor generates a signal indicative of a dew point of the working fluid; further comprising a pressure sensor; wherein the pressure sensor measures a pressure of the working fluid; wherein the working fluid includes air; further comprising an electronic controller operably connected to at least one of a pressure sensor, a temperature sensor, a moisture sensor, and at least one control valve; wherein the electronic controller is operable for controlling discharge temperature of the compressor; wherein the electronic controller is operable for controlling a temperature differential of the compressible working fluid and the lubrication fluid entering the compressor; wherein the electronic controller is operable for minimizing a temperature differential of the compressible working fluid and the lubrication fluid entering the compressor and minimalizing a temperature and moisture content of the working fluid entering the compressor; wherein the minimum temperature differential of the compressible working fluid and the lubrication fluid entering the compressor is zero.

In another aspect, the present disclosure includes an apparatus comprising: an oil flooded compressor operable for compressing a working fluid; a heat exchanger positioned upstream of the compressor having passageways for oil and compressible working fluid to be transported therethrough in a heat transfer relationship, wherein the temperature of the oil is reduced and the temperature of the air is increased within the heat exchanger; and a control system including an electronic controller operable for controlling an inlet temperature of the oil entering the compressor and a discharge temperature of the working fluid exiting the compressor.

In refining aspects, the present disclosure includes an apparatus further comprising a least one valve operably coupled to the control system configured to selectively control a flow of the oil into the heat exchanger; wherein a temperature differential between the oil and working fluid at the inlet to the compressor is minimized; a dehumidifier operable for removing moisture from the working fluid upstream of the heat exchanger; an oil cooler configured to selectively cool a portion of the oil downstream of the heat exchanger; a sensor for sensing at least one parameter including a pressure, a temperature and/or a mass flow rate of the working fluid and/or the oil and transmitting a signal indicative of the sensed parameter to the electronic controller.

In another aspect, the present disclosure includes a method comprising: a method comprising: dehumidifying air with a dehumidifier; circulating heated oil to the dehumidifier after being discharged from an air compressor; regenerating the dehumidifier with the heated oil; cooling the oil during the regenerating; flowing the oil to an inlet heat exchanger downstream of the dehumidifier; flowing the air from the dehumidifier to the inlet heat exchanger; exchanging heat between the air and oil to reduce a temperature differential therebetween; supplying the air and the oil to an oil flooded compressor after the heat exchanging; compressing the air; and transferring heat from the compressor to the oil.

In refining aspects the method further comprises selectively bypassing at least a portion of the oil discharged from the dehumidifier past the inlet heat exchanger; selectively cooling a portion of the oil with an oil cooler; controlling a temperature of the compressed air discharged to a predefining limit; wherein the predefined temperature limit of the discharged air includes a safety factor above a dew point temperature; wherein the controlling includes controlling oil temperature entering the compressor; and flowing the air through an air-to-air heat exchanger upstream of the compressor.

In another aspect the present disclosure includes a method comprising measuring a discharge pressure of compressed working fluid downstream of a compressor; determining a dew point temperature of the working fluid discharged from the compressor; controlling a discharge temperature of the working fluid exiting the compressor; controlling an inlet temperature of a lubricant entering the compressor; and wherein controlling the discharge temperature of the working fluid includes: transferring heat from lubricant discharged from the compressor to working fluid in a heat exchanger prior to entering the compressor.

In refining aspects, the method further comprises minimizing the temperature differential between the air and the lubricant during the transferring; wherein the controlling further includes controlling oil inlet temperature upstream of the compressor; removing moisture from the working fluid with a dehumidifier upstream of the compressor; and regenerating the dehumidifier with heated oil discharged from the compressor; selectively cooling a portion of the lubricant with a lubricant cooler downstream of the heat exchanger; and selectively cooling a portion of the working fluid in a second heat exchanger downstream of the heat exchanger.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A compressor system comprising:
    a lubrication supply system operable for supplying lubricant to a lubrication flooded compressor;
    a dehumidifier operable for removing moisture from a compressible working fluid;
    a heat based regeneration system having media for absorbing moisture, the regeneration system including a lubricant passageway adapted to receive heated lubricant discharged from the compressor such that the media is regenerated and the lubricant is cooled as the lubricant flows through the passageway;
    an inlet heat exchanger configured to receive compressible working fluid and heated lubricant exiting from the dehumidifier, the compressible working fluid and the lubricant forming a heat transfer relationship such that the lubricant is cooled and the compressible working fluid is heated in the inlet heat exchanger; and
    a first conduit for transporting the heated compressible working fluid from the inlet heat exchanger to the compressor and a second conduit for transporting the cooled lubricant from the inlet heat exchanger to the compressor, wherein the compressor compresses the compressible working fluid and discharges a mixture of compressible working fluid and lubricant at a desired pressure and temperature.

2. The compressor system of claim 1 further comprising a lubricant cooler.

3. The compressor system of claim 2 further comprising a lubricant cooler bypass valve operably coupled to the lubricant cooler.

4. The compressor system of claim 1 further comprising an inlet heat exchanger bypass valve operable to selectively bypass a portion of the lubricant past the inlet heat exchanger.

5. The compressor system of claim 1 further comprising a temperature sensor.

6. The compressor system of claim 5, wherein the temperature sensor measures at least one of a lubricant temperature and a working fluid temperature.

7. The compressor system of claim 1 further comprising a moisture sensor.

8. The compressor system of claim 7, wherein the moisture sensor generates a signal indicative of a pressure dew point temperature of the working fluid.

9. The compressor system of claim 1 further comprising a pressure sensor.

10. The compressor system of claim 9, wherein the pressure sensor measures a pressure of the working fluid.

11. The compressor system of claim 1 further comprising an electronic controller operably connected to at least one of a pressure sensor, a temperature sensor, a moisture sensor, and a control valve.

12. The compressor system of claim 11, wherein the electronic controller is operable for controlling a temperature of the working fluid discharged from the compressor.

13. The compressor system of claim 11, wherein the electronic controller is operable for controlling a temperature of the lubricant entering the compressor.

14. The compressor system of claim 11, wherein the electronic controller is operable for minimizing a temperature and moisture content of the working fluid entering the compressor.

15. The compressor system of claim 11, wherein the electronic controller is operable for controlling a temperature differential of the compressible working fluid and the lubricant entering the compressor.

16. The compressor system of claim 11, wherein the electronic controller is operable for minimizing a temperature differential of the compressible working fluid and the lubrication fluid entering the compressor.

17. The compressor system of claim 16, wherein the minimum temperature differential of the compressible working fluid and the lubrication fluid entering the compressor is zero.

* * * * *